(12) United States Patent
Schrunk

(10) Patent No.: US 11,668,055 B2
(45) Date of Patent: Jun. 6, 2023

(54) RAIL MILLING VEHICLE

(71) Applicant: Harsco Technologies LLC, Fairmont, MN (US)

(72) Inventor: Robert R. Schrunk, Fairmont, MN (US)

(*) Notice: Subject to any disclaimer, the term of this patent is extended or adjusted under 35 U.S.C. 154(b) by 0 days.

(21) Appl. No.: 16/550,787

(22) Filed: Aug. 26, 2019

(65) Prior Publication Data

US 2020/0063377 A1 Feb. 27, 2020

Related U.S. Application Data

(60) Provisional application No. 62/723,387, filed on Aug. 27, 2018.

(51) Int. Cl.
*B23C 3/00* (2006.01)
*B23B 5/32* (2006.01)
(Continued)

(52) U.S. Cl.
CPC ............... *E01B 31/13* (2013.01); *B23B 5/28* (2013.01); *B23B 5/32* (2013.01); *B23C 3/00* (2013.01);
(Continued)

(58) Field of Classification Search
CPC . Y10T 409/306384; Y10T 409/304144; Y10T 409/3042; Y10T 409/304256;
(Continued)

(56) References Cited

U.S. PATENT DOCUMENTS 3,358,406 A * 12/1967 Speno, Jr. ............... E01B 31/17
451/347
3,945,152 A * 3/1976 Helgemeir ............. E01B 31/12
451/347
(Continued)

FOREIGN PATENT DOCUMENTS

CH 693960 5/2004
EP 0125348 10/1986
(Continued)

OTHER PUBLICATIONS

International Search Report and Written Opinion Issued in Corresponding PCT Patent Application No. PCT/US2019/048098, dated Dec. 12, 2019.
(Continued)

*Primary Examiner* — Nicole N Ramos
(74) *Attorney, Agent, or Firm* — Norton Rose Fulbright US LLP

(57) ABSTRACT

The present disclosure relates to a rail vehicle that includes a chassis and a rail milling assembly coupled to the chassis. The rail milling assembly includes a bracket for coupling the rail milling assembly to the chassis and a milling workhead forming a portion of the rail milling assembly. The milling workhead including a spindle and a cutter depending downwardly from the spindle. The spindle and cutter are driven by a spindle motor. The milling workhead further includes a cylinder rod disposed between the spindle motor and the spindle to thereby bias the cutter towards the rail during operation.

20 Claims, 4 Drawing Sheets

(51) Int. Cl.
*E01B 31/13* (2006.01)
*B61D 15/00* (2006.01)
*B23C 3/04* (2006.01)
*B23B 5/28* (2006.01)

(52) U.S. Cl.
CPC ............... *B23C 3/002* (2013.01); *B23C 3/04* (2013.01); *B61D 15/00* (2013.01)

(58) Field of Classification Search
CPC ... Y10T 409/306496; Y10T 409/30672; Y10T 409/305208; B23C 3/005; B23C 1/007; B23C 1/20; B23C 2215/32; B23C 3/002; E01B 31/12; E01B 31/13; B23B 5/32; B23B 5/28
See application file for complete search history.

(56) References Cited

U.S. PATENT DOCUMENTS

| | | | | |
|---|---|---|---|---|
| 4,492,059 A * | 1/1985 | Panetti | ..................... | E01B 31/17 451/347 |
| 4,583,327 A * | 4/1986 | Jaeggi | ..................... | E01B 31/17 451/347 |
| 4,621,460 A | 11/1986 | Scheuchzer et al. | | |
| 4,622,781 A * | 11/1986 | Vieau | ..................... | E01B 31/17 451/347 |
| 4,829,723 A * | 5/1989 | Bull | ..................... | E01B 31/17 451/28 |
| 4,993,193 A | 2/1991 | Panetti | | |
| 5,265,379 A * | 11/1993 | Panetti | ..................... | E01B 31/17 451/11 |
| 5,549,505 A * | 8/1996 | Jaeggi | ..................... | E01B 31/12 451/69 |
| 5,566,437 A * | 10/1996 | Jaeggi | ..................... | E01B 31/18 29/33 R |
| 5,678,966 A | 10/1997 | Heimann | | |
| 6,033,166 A * | 3/2000 | Hampel | ..................... | B23C 3/005 409/175 |
| 6,769,365 B1 * | 8/2004 | Ward | ..................... | B23B 5/32 104/26.1 |
| 6,953,386 B1 * | 10/2005 | Korinek | ..................... | B24B 19/004 451/28 |
| 7,156,723 B2 * | 1/2007 | Natarajan | ..................... | E01B 31/17 451/347 |
| 7,442,115 B1 * | 10/2008 | Brenny | ..................... | E01B 31/17 451/65 |
| 2003/0083001 A1 * | 5/2003 | Natarajan | ..................... | G06Q 30/0284 451/65 |
| 2012/0288342 A1 * | 11/2012 | Rungger | ..................... | B23C 3/005 409/231 |
| 2013/0189045 A1 * | 7/2013 | Behrens | ..................... | E01B 31/13 409/132 |
| 2015/0111472 A1 * | 4/2015 | Palese | ..................... | E01B 31/17 451/5 |

FOREIGN PATENT DOCUMENTS

| | | |
|---|---|---|
| JP | H 05106203 | 4/1993 |
| JP | H 07229103 | 8/1995 |
| JP | 2004/190334 | 7/2004 |
| WO | WO 2011/088492 | 7/2011 |

OTHER PUBLICATIONS

International Preliminary Report on Patentability issued in International Application No. PCT/US2019/048098 dated Dec. 11, 2020.
Partial Supplementary European Search Report issued in Corresponding European Application No. 19854371.2 dated Apr. 5, 2022.

* cited by examiner

RAIL MILLING VEHICLE

CROSS-REFERENCE TO RELATED APPLICATION

This application claims priority to U.S. Provisional Patent Application No. 62/723,387 filed on Aug. 27, 2018, the disclosure of which is hereby incorporated by reference in entirety.

BACKGROUND

As described throughout, a railroad track may include a pair of elongated, substantially parallel rails, which may be coupled to a plurality of laterally extending rail ties. In some embodiments, a top surface of each rail tie may be coupled to a bottom surface of the rails. The rail ties may be disposed on a ballast bed of hard particulate material such as gravel (e.g., ballast, rocks, and/or the like) and may be used to support the rails. Over time, normal wear and tear on the railroad may cause the rail to degrade, thus requiring operations to repair the rail.

Rail grinders are commonly used to repair the rail running surface due to deformation and shape the transverse section of the rail to control the wheel/rail interface. Grinders may be handheld, cart mounted, or rail-bound machines. Rail grinders are applied to the rail to grind away deformations. As an alternative to rail grinding, rail milling machines may be used to perform a cutting process to remove portions of rail and help restore the rail profile. In conventional applications, milling machines first pass over the running rail to perform a cutting process to repair rail profile. Thereafter, grinding machines or grinding attachments that are part of the milling machine further address the portion of rail that has been milled in order to complete the repair process. What is needed is a machine and process for repairing rail that does not require multiple operations, thus making the repair process more efficient, and also avoiding the sparks and dust inherent to any grinding operation.

BRIEF SUMMARY

The present disclosure relates to a rail vehicle that includes a chassis and a rail milling assembly coupled to the chassis. The rail milling assembly includes a bracket for coupling the rail milling assembly to the chassis and a milling workhead forming a portion of the rail milling assembly. The milling workhead including a spindle and a cutter depending downwardly from the spindle. The spindle and cutter are driven by a spindle motor. The milling workhead further includes a cylinder rod disposed between the spindle motor and the spindle to thereby bias the cutter towards the rail during operation.

Each milling workhead optionally includes a shroud disposed about the cutter for capturing sparks and dust. Further, the rail milling assembly is adapted to float both laterally and in a vertical direction, thus accommodating variations and curves in the rail. The milling workheads may be fixed in an angular position relative to the rail and may be extended axially towards the rail in an operation mode via the cylinder rod, which may be a double rod cylinder.

In some embodiments, multiple milling workheads are provided for each rail milling assembly, such as ten milling workheads—five for each side of rail. The rail milling assemblies may be provided in a multiple car consist, such as a three-car consist, thus providing up to thirty milling workheads. Related methods of carrying out rail milling operations are described.

BRIEF DESCRIPTION OF THE DRAWINGS

Reference is now made to the following descriptions taken in conjunction with the accompanying drawings.

DETAILED DESCRIPTION

Various embodiments of a rail milling vehicle and associated methods of using such rail vehicles for milling rail according to the present disclosure are described. It is to be understood, however, that the following explanation is merely exemplary in describing the devices and methods of the present disclosure. Accordingly, several modifications, changes and substitutions are contemplated.

Figure 1:
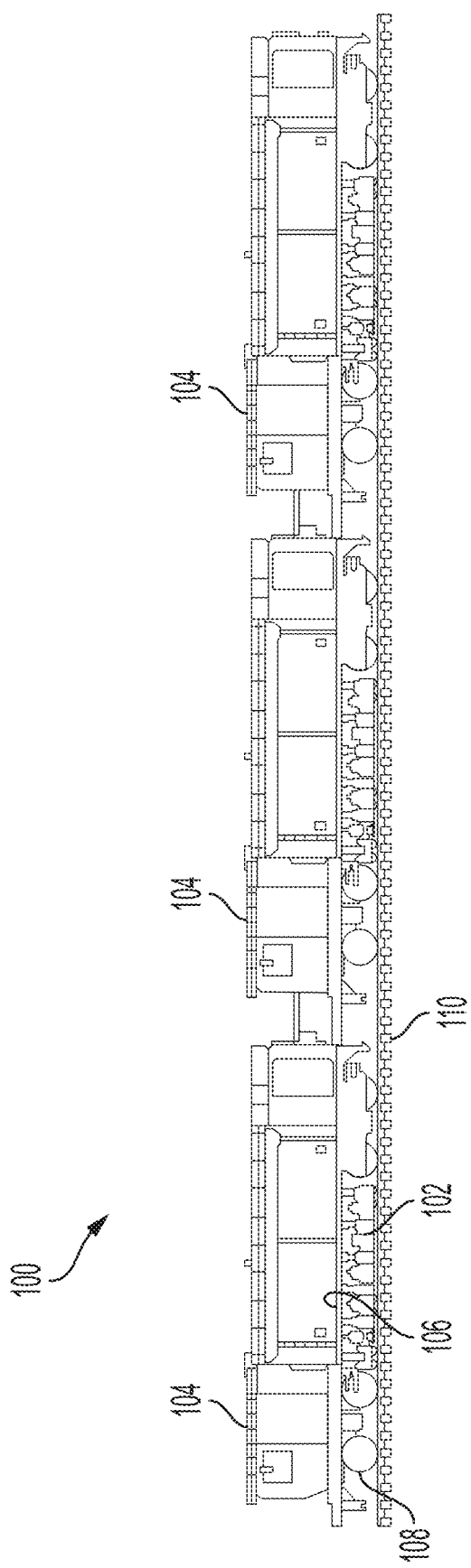
FIG. 1 illustrates a side view of an exemplary rail vehicle having a milling assembly for milling rail.

Referring to FIG. 1, a rail vehicle 100 for performing rail maintenance operations includes rail milling assemblies 102 for carrying out rail milling operations. In some embodiments, the rail vehicle 100 may include three rail cars 104, thus constituting a three-car consist. The rail vehicle 100 includes a chassis 106 and rail wheels 108 coupled to the chassis for enabling the rail vehicle to travel along rail track 110. The rail vehicle 100 further includes a propulsion device for propelling the rail vehicle along track 110. In some embodiments, the rail vehicle 100 may include an operator cabin for housing an operator of the rail vehicle. However, in other embodiments, the operator cabin may be removed and the rail vehicle 100 may operate as a drone or autonomous maintenance vehicle. In such embodiments, the drone vehicle does not have a human operator, but rather is operated remotely. Further, the rail vehicle 100 may travel track in either direction, while milling activities may take place from right to left as viewed in FIG. 1.

Figure 2:
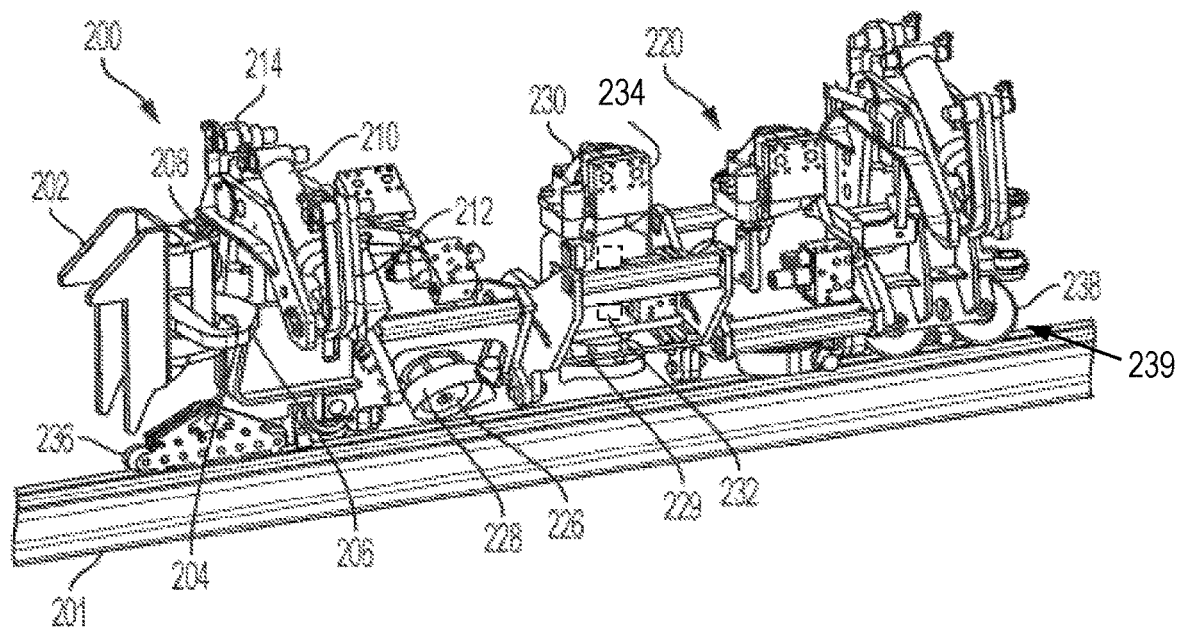
FIG. 2 illustrates a perspective view of a milling assembly according to according to the present disclosure.
Figure 3:
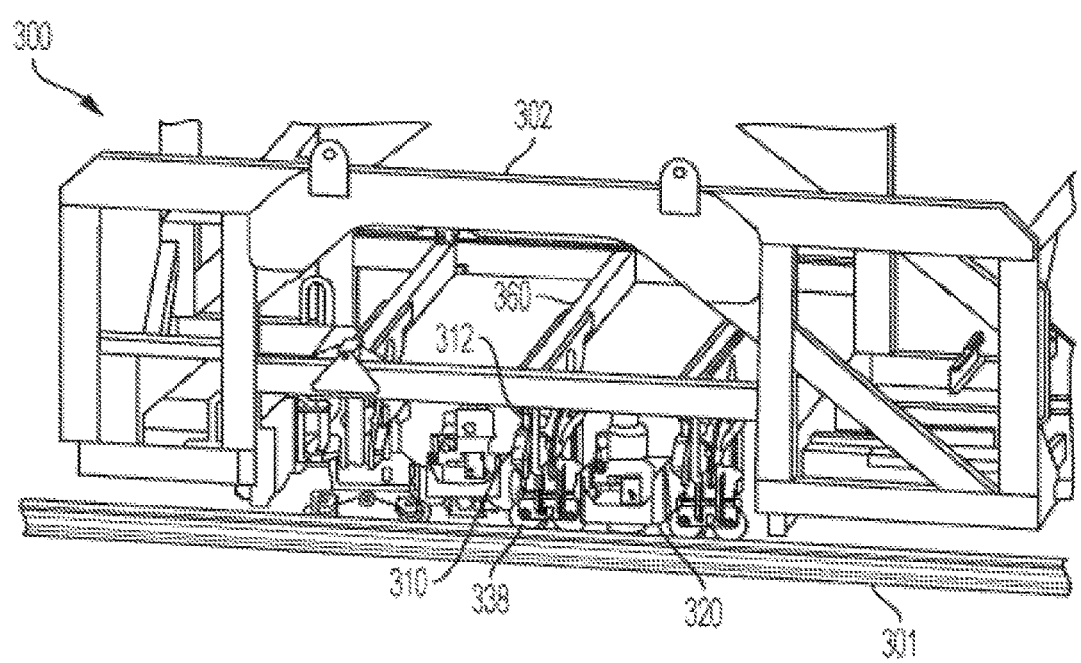
FIG. 3 illustrates a perspective view of a milling assembly according to another embodiment of the present disclosure.

A rail milling assembly 200 for milling rail 201 according to an embodiment of the present disclosure is depicted in FIG. 2. The rail milling assembly 200 includes a number of components that cooperate to provide for improved milling of a rail profile. As shown, the rail milling assembly 200 is designed for operation from right to left in this view. The rail milling assembly 200 includes a forwardly positioned bracket 202, which is operable to couple the carriage to a rail chassis (as depicted in the embodiment of FIG. 3). In some embodiments, the carriage may be coupled to Harsco's C-Model grinder chassis in place of the grinding carriage.

While the bracket 202 is fixed to the chassis, the rail milling assembly 200 is permitted to float both vertically and laterally via an oblong slot 204 defined in a front frame member 206 of the rail milling assembly. That is, a pin member 208 fixed to the bracket 202 is disposed through the slot 204, thus operably coupling the rail milling assembly 200 to the bracket and the rail chassis. Such an arrangement permits the milling workheads (to be described) to stay referenced to the gauge face of the rail 201, and also vertically to stay referenced to the top of the rail. An actuator 210, such as a hydraulic cylinder, is disposed proximal to the front frame member 206 and extends in the lateral direction between a pair of linkage elements 212, 214. The cylinder 210 is free floating and allows for biasing of the linkage elements 212, 214 in the lateral direction to accommodate for gauge variations, curves, and non-uniform sections of rail. The linkage elements 212, 214 are pinned to the chassis (as better shown in FIGS. 3 and 4). A similar arrangement is disposed at the rear of the rail milling assembly 200.

In the embodiment of FIG. 2, a plurality of milling workheads 220 are disposed between a front portion and a rear portion of the rail milling assembly 200. Each milling workhead 220 includes a cutter 226 disposed within a shroud 228. The cutter 226 is coupled to a spindle 229, which in turn, is coupled to a spindle motor 230 for imparting rotation to the spindle and therefore the cutter. The milling workhead includes a hydraulic cylinder 232, which contains the rotating elements, supports the spindle motor 230 and may be actuated to impart motion of the rod relative to the cylinder to thereby bias the cutter 226 downwardly toward the rail 201 when an operating position is desired. In some embodiments, the cylinder rod 232 is a double rod cylinder. The particular configuration of the cylinder rod 232 of the milling workhead 220 allows for the cylinder rod to support and deploy the spindle 229 while maintaining its angles.

A support plate 234 adapts the spindle motor 230 to the cylinder rod 232 (thus preventing spinning of the rod through a bushing arrangement) and the cutter 226. The shroud 228 around the cutter 226 is adapted to contain the removed rail chips and to allow for a vacuum system to pull the chips away from the cutter. A chip collection unit (not shown) may be provided to collect chips via the use of a centrifugal blower associated with the milling workhead 220.

In some embodiments, each milling workhead 220 is fixed in position relative to the rail 201 during rail milling operations. That is, the milling workheads 220 may be arranged at unique angles, thus allowing the milling workheads to address a portion of the rail necessary for rail maintenance and defect correction. In some embodiments, no two milling workheads are set to operate at the same angle thus maximizing the rail to be addressed in the milling process. In this manner, the operator does not need to select a "pattern" as is the case with a rail grinder, but rather selects a specific rail "profile." For example, if twenty milling workheads 220 are being used, they can generate twenty individual facets that produce the selected rail profile. This allows the operator to apply one profile in one track segment and then seamlessly switch to a different profile for another track segment.

The rail milling assembly 200 further includes a roller assembly 236 disposed at the front portion 222 of the rail milling assembly. The roller assembly 236 provides a reference for the milling workheads 220 as the rail milling assembly 200 approaches rough sections of rail. Further, a number of rollers 238 may be disposed on the rail milling assembly 200 to provide gauge reference rollers to maintain a consistent lateral position of the carriage. In some embodiments, the roller 238 disposed at the front portion of the rail milling assembly 200 has a gauge reference flange 239. In some embodiments, the rollers 238 disposed at the rear portion of the rail milling assembly 200 have a conical tread along with a gauge reference flange. The gauge reference 239 flange may be tilted inwardly such that it slices in at the rail 201 instead of sliding straight down. In this manner, the rollers 238 disposed at the rear portion of the rail milling assembly 200 avoid the vertical friction that is associated with typical flanged rollers. Further, the roller assembly 236 may have overlapping wheels in order to provide for more wheels in a smaller space. Such an arrangement facilitates the roller assembly 236 to skim over gaps and defects in the rail 201 without imparting much vertical movement to the lead spindle 229.

FIG. 3 depicts an alternative embodiment in which a rail milling assembly 300 is coupled to a chassis 302 of a rail vehicle (such as rail vehicle 100 depicted in FIG. 1). The rail milling assembly 300 is similar in construct to the rail milling assembly 200 described above with reference to FIG. 2; however, the rail milling assembly 300 is modified to include only one milling workhead 320 between rollers 338. The rail milling assembly 300 is coupled to frame members 360 that are pinned to linkage elements 312, 314 and hydraulic cylinder 310. The frame members 360 extend laterally from one rail 301 to the other rail (not depicted) of the track. In this manner, the frame members 360 may further couple the rail milling assembly 300 to the chassis 302. Also, while not depicted, in practice, an additional rail milling assembly is disposed over the other rail such that both rails may be milled according to the disclosures herein. Further, it is to be appreciated that the frame members 360 may be mounted on a pivot that allows for slight rotation of the frame members during operation.

Figure 4:
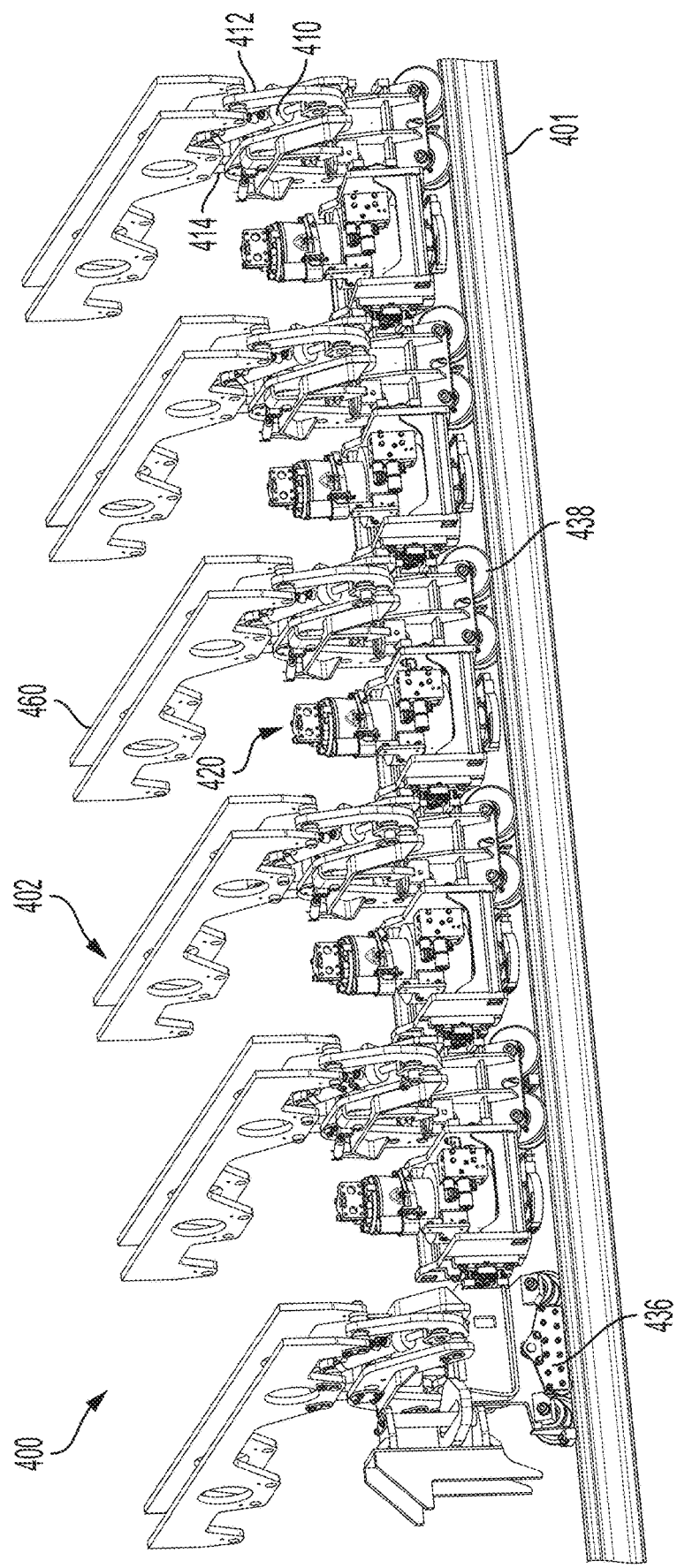
FIG. 4 illustrates a perspective view of a milling assembly according to another embodiment of the present disclosure.

FIG. 4 depicts an alternative embodiment in which a rail milling assembly 400 is coupled to a chassis 402 of a rail vehicle (such as rail vehicle 100 depicted in FIG. 1). The rail milling assembly 400 is similar in construct to the rail milling assembly 200 described above with reference to FIG. 2 and the rail milling assembly 300 described above with respect to FIG. 3; however, the rail milling assembly 400 is modified to include five milling workheads 420 that are interposed by rollers 438. In addition, a roller assembly 436 may be assembled at a front portion of the rail milling assembly 400, while a roller 438 may be positioned at a rear of the rail milling assembly.

Similar to the embodiment of FIG. 3, the rail milling assembly 400 is coupled to frame members 460 that are pinned to linkage elements 412, 414 and hydraulic cylinder 410. The frame members 460 extend laterally from one rail 401 to the other rail (not depicted) of the track. In this manner, the frame members 460 may further couple the rail milling assembly 400 to the chassis (not shown). Also, while not depicted, in practice, an additional rail milling assembly is disposed over the other rail such that both rails may be milled according to the disclosures herein. Further, it is to be appreciated that the frame members 460 may be mounted on a pivot that allows for slight rotation of the frame members during operation.

Figure 5:
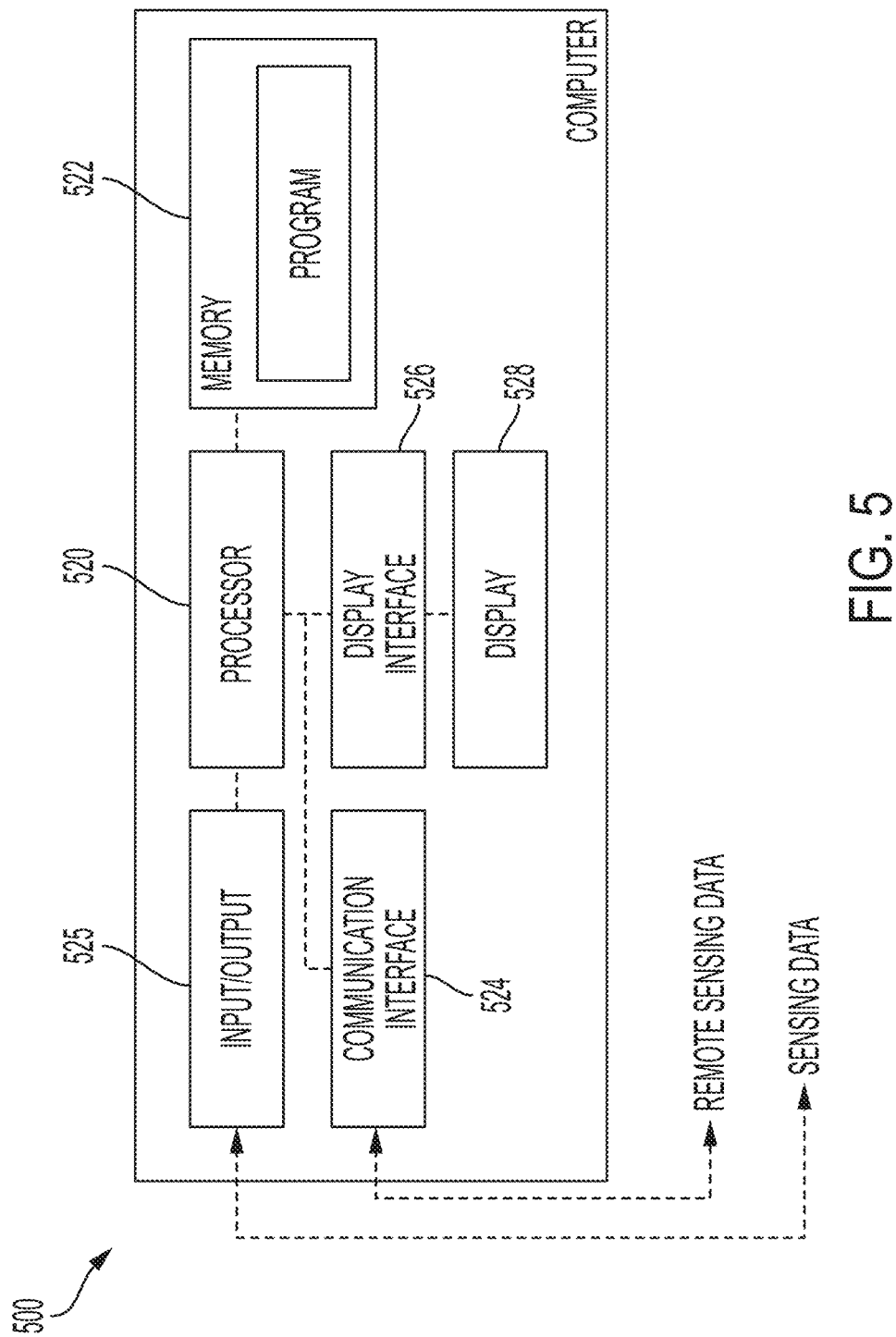
FIG. 5 illustrates a computing system associated with the milling assembly.

Referring to FIG. 5, the rail vehicle 100 may be equipped with a computing or control system that may take the form of a computer or data processing system 500 that includes a processor 520 configured to execute at least one program stored in memory 522 for the purposes of performing one or more of the processes disclosed herein. The processor 520 may be coupled to a communication interface 524 to receive remote sensing data, such as the profile of rail, as well as transmit instructions to receivers distributed throughout the rail vehicle 100, such as to the milling workheads to commence rail milling operations. The processor 520 may also receive and transmit data via an input/output block 525. In addition to storing instructions for the program, the memory may store preliminary, intermediate and final datasets involved in techniques that are described herein. Among its other features, the computing system 500 may include a display interface 526 and a display 528 that displays the various data that is generated as described herein. It will be appreciated that the computing system 500 shown in FIG. 5 is merely exemplary in nature and is not limiting of the systems and methods described herein.

The computing system 500 may be utilized to implement a control system for use with the described rail milling vehicle. For example, the control system may be designed to allow an operator to select a template for achieving the desired, final rail shape. This lies in contrast to conventional grinders with which operators select a grinding pattern. Grinding patterns are set up to take metal off of some focus region on the rail, and require multiple passes to achieve the desired rail shape. With the template that is selected with the presently described rail milling vehicle, the desired, final rail shape may be achieved with only one pass, thus reducing the time required for surface treatment of a given rail.

The control system for use with the described rail milling vehicle is able to self-calibrate on a section of track for which the existing cross-sectional rail profile has been accurately measured. This allows a computer associated with the control system to determine the required feed cylinder extensions for each spindle for that particular rail profile. From this, the computer may calculate the required feed cylinder extensions for any other rail profile (template) that the operator might select. If the desired template is a standard rail section, this rail section should be included in the library of selectable options. As envisioned, the system would identify a collection of the most common standard rail sections. If a railway wants a unique, customized template, the system would be able to import a measured profile that is known to match the desired template, or the special profile may be programmed as a selectable library option.

Several advantages may be achieved by implementing a rail milling vehicle according to the principles disclosed herein. Given the number of milling cutters associated with the milling vehicle described herein, it is possible to complete milling processes without having to follow with grinding processes after the milling processes. That is, the milling vehicle according to the present disclosure may obviate the need to have additional grinding vehicles and workheads to complete the repair process. In this manner, the sparks and dust associated with conventional grinding processes may be avoided. In addition, the shroud and vacuum process may be utilized to collect milled chips of rail, thus leaving the rail surface and surrounding area substantially free of such milled chips. Still further, the milling vehicle of the present disclosure may offer the following benefits over conventional milling technology:

Higher work speed, e.g., two times the speed of conventional milling technology

Ability to remove less material when employed in maintenance mode as opposed to corrective mode Ability to produce multiple rail profiles, e.g., versus conventional milling technology where the rail shape is built into the cutter Avoids need for clean-up grinding Ability to operate on track with poor support, e.g. whereas conventional milling technology causes excessive chatter.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

What is claimed is:

1. A rail vehicle, comprising:
a floating rail milling assembly configured to be coupled to a chassis, the floating rail milling assembly floating in relation to a rail, via a pin configured to move both vertically and laterally within a slot defined in a front frame member, the floating rail milling assembly including:
a plurality of milling workheads, each milling workhead of the plurality of milling workheads forming a portion of the floating rail milling assembly, each milling workhead including:
a spindle;
a cutter depending downwardly from the spindle, the spindle and cutter configured to be driven by a spindle motor; and
a cylinder rod disposed between the spindle motor and the spindle and configured to move the cutter towards the rail during operation;
wherein:
each cutter of the plurality of milling workheads is independently moveable, via the cylinder rod, towards the rail relative to other cutters of the plurality of milling workheads; and
at least one milling workhead of the plurality of milling workheads is fixed at an angular position relative to the rail.

2. The rail vehicle of claim 1, wherein:
each of the plurality of milling workheads is positioned at an operation angle relative to the rail;
each of the plurality of milling workheads disposed at the same operation angle defines a group of milling workheads; and
no two groups of milling workheads are positioned to operate at the same operation angle.

3. The rail vehicle of claim 1, wherein:
the rail milling assembly further includes:
a bracket configured to couple the rail milling assembly to the chassis; and
the front frame member operatively coupled to a first milling workhead of the plurality of milling workheads, the front frame member including the slot for receiving the pin coupled to the bracket;
the slot comprises an oblong slot; and
the pin is configured to move in both a lateral direction and a vertical direction through the oblong slot, such that the milling workheads float relative to the bracket.

4. The rail vehicle of claim 3, further comprising:
a pair of supports coupled to the front frame member; and
a hydraulic cylinder that extends between the pair of supports, the hydraulic cylinder configured to bias the pair of supports in the lateral direction.

5. The rail vehicle of claim 2, wherein the plurality of milling workheads comprise:
a first group of milling workheads of the groups of milling workheads configured to grind a first side of the rail; and
a second group of milling workheads of the groups of milling workheads configured to grind a second side of the rail, that is opposite the first side.

6. The rail vehicle of claim 1, wherein at least one milling workhead of the plurality of milling workheads further includes a shroud surrounding the cutter and configured to be coupled to a vacuum system.

7. The rail vehicle of claim 1, wherein the rail milling assembly further includes rollers interposed between each of the plurality of milling workheads.

8. The rail vehicle of claim 7, wherein rollers disposed at a rear portion of the rail milling assembly comprise a conical tread and a gauge reference flange, the gauge reference flange being tilted inwardly toward the rail.

9. The rail vehicle of claim 1, wherein each cutter of the plurality of milling workheads is positioned at an operation angle relative to the rail and no two cutters of the plurality of milling workheads are positioned to operate at the same operation angle.

10. A rail milling assembly configured to be coupled to a chassis of a rail vehicle, the rail milling assembly comprising:
    a plurality of milling workheads, each milling workhead of the plurality of milling workheads comprising:
        a spindle;
        a cutter depending downwardly from the spindle, the spindle and cutter configured to be driven by a spindle motor; and
        a cylinder rod coupled to the spindle motor and the spindle and configured to extend the cutter towards a rail from a stowed position to an extension position, during operation; and
    a processor configured to:
        receive a rail profile template corresponding to a desired rail shape;
        based on the rail profile template, calculate an extension distance between the stowed position and the extension position associated with each cutter of the plurality of milling workheads; and
        actuate the cylinder rods of the plurality of milling workheads to move a respective cutter of the plurality of milling workheads to the extension positions associated with each cutter;
    wherein each of the plurality of milling workheads is fixed at a unique angle relative to the rail, no two milling workheads being positioned at the same angle.

11. The rail vehicle of claim 10, wherein the plurality of milling workheads are disposed on a floating rail milling assembly configured to be coupled to a chassis, the floating rail milling assembly floating in relation to a rail, via a pin configured to move both vertically and laterally within a slot defined in a front frame member of the floating rail milling assembly.

12. The rail vehicle of claim 11, wherein the cylinder rods of the plurality of milling workheads are actuated to move the respective cutters between a stowed position and an engaged position along the unique angle.

13. The rail vehicle of claim 11, further comprising a display interface configured to selectively display a plurality of rail profiles comprising the rail profile template.

14. The rail vehicle of claim 13, wherein the processor is further configured to measure an existing cross-sectional rail profile of the rail.

15. The rail vehicle of claim 10, wherein each of the plurality of milling workheads further includes a shroud disposed about the cutter.

16. The rail vehicle of claim 10, wherein the rail milling assembly further includes rollers interposed between adjacent milling workheads of the plurality of milling workheads.

17. The rail vehicle of claim 16, wherein rollers disposed at a rear portion of the rail milling assembly comprise a conical tread and a gauge reference flange, the gauge reference flange being tilted inwardly toward the rail.

18. A method for performing milling operations on rail, the method comprising:
    selecting a rail profile template that corresponds to a desired rail profile of a rail;
    actuating, by a processor, a plurality of milling workheads coupled to a rail vehicle, each milling workhead of the plurality of milling workheads including a spindle and a cutter depending downwardly from the spindle, and a spindle motor coupled to the spindle through a cylinder rod;
    operating the spindle motors of the plurality of milling workheads to drive the spindles and the cutters;
    actuating a first cylinder rod of a first milling workhead relative to the plurality of milling workheads to move a first cutter to a first predetermined position at a first angle relative to the rail that corresponds to the desired rail profile of a rail;
    actuating a second cylinder rod of a second milling workhead of the plurality of milling workheads to move a second cutter to a second predetermined position at a second angle relative to the rail that corresponds to the desired rail profile of a rail; and
    performing a rail cutting operation with the first cutter to thereby remove a portion of the rail to form the desired rail profile
    where the first cylinder rod is fixed at the first angle relative to the rail; and
    the second cylinder rod is fixed at the second angle relative to the rail.

19. The method of claim 18, further comprising:
    measuring an existing cross-sectional rail profile of the rail; and
    capturing, by a shroud surrounding the first cutter, debris generated during the rail cutting operation.

20. The method of claim 18,
    wherein:
        each of the plurality of milling workheads are positioned at a fixed angle relative to the rail; and
        actuating the first and second cylinder rods comprises deploying a first spindle of the first milling workhead and deploying a second spindle of the second milling workhead while maintaining the fixed angle of the first and second milling workheads relative to the rail.

* * * * *